(12) United States Patent
Chinthekindi et al.

(10) Patent No.: US 11,392,458 B2
(45) Date of Patent: *Jul. 19, 2022

(54) RECONSTRUCTING LOST DATA OBJECTS BY GENERATING VIRTUAL USER FILES FROM AVAILABLE NODES WITHIN A CLUSTER

(71) Applicant: EMC IP Holding Company LLC, Hopkinton, MA (US)

(72) Inventors: Ramprasad Chinthekindi, San Jose, CA (US); Shyam Burkule, Santa Clara, CA (US); Kalidas Balakrishnan, San Jose, CA (US); Kalyan C Gunda, Bangalore (IN); Subrahmanyam Josyula, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 180 days.

This patent is subject to a terminal disclaimer.

(21) Appl. No.: 16/664,634

(22) Filed: Oct. 25, 2019

(65) Prior Publication Data
US 2021/0124645 A1    Apr. 29, 2021

(51) Int. Cl.
*G06F 11/00* (2006.01)
*G06F 11/14* (2006.01)
*G06F 16/31* (2019.01)
*G06F 11/07* (2006.01)

(52) U.S. Cl.
CPC ...... *G06F 11/1435* (2013.01); *G06F 11/0727* (2013.01); *G06F 11/0793* (2013.01); *G06F 11/1451* (2013.01); *G06F 11/1464* (2013.01); *G06F 16/322* (2019.01); *G06F 2201/83* (2013.01)

(58) Field of Classification Search
CPC ............ G06F 11/1453; G06F 2201/84; G06F 11/1451; G06F 11/1469; G06F 16/1748; G06F 11/1448; G06F 11/1471; G06F 16/1756

See application file for complete search history.

(56) References Cited

U.S. PATENT DOCUMENTS

| | | | | |
|---|---|---|---|---|
| 8,255,366 B1* | 8/2012 | Bagley | ............... | G06F 11/1469 707/646 |
| 8,706,701 B1* | 4/2014 | Stefanov | ............ | G06F 11/1088 707/687 |
| 8,909,605 B1* | 12/2014 | Li | ..................... | G06F 16/24568 707/681 |
| 8,935,446 B1* | 1/2015 | Shilane | ............... | G06F 12/0871 710/62 |
| 9,304,914 B1* | 4/2016 | Douglis | .............. | G06F 12/0871 |
| 9,336,143 B1* | 5/2016 | Wallace | ................ | G06F 3/0641 |

(Continued)

*Primary Examiner* — Loan L. T. Truong
(74) *Attorney, Agent, or Firm* — Staniford Tomita LLP (57) ABSTRACT

Embodiments of method and system are directed to a best effort method to reconstruct corrupt files from available nodes or tiers and heal or repair the corrupt files within a cluster of nodes. The method looks for the existence of fingerprints of the lost segments in available tiers on the nodes or across nodes within a cluster. The method discovers the copies of these missing segments, creates an Lp tree referring these discovered segments and creates a virtual file in the namespace. The file is then moved to the destination tier where the corruption exists, thus healing the corruption.

15 Claims, 10 Drawing Sheets

(56) References Cited

U.S. PATENT DOCUMENTS

| | | | |
|---|---|---|---|
| 9,390,116 B1* | 7/2016 | Li | G06F 16/2272 |
| 9,396,071 B1* | 7/2016 | Akanda | G06F 9/45533 |
| 9,430,164 B1* | 8/2016 | Botelho | G06F 3/0655 |
| 9,836,514 B2* | 12/2017 | Kruglick | G06F 16/27 |
| 9,916,203 B1* | 3/2018 | Pogde | G06F 11/1448 |
| 10,599,533 B2* | 3/2020 | Petri | H04L 29/0854 |
| 10,860,259 B1* | 12/2020 | Winarski | G06F 3/0649 |
| 10,915,497 B1* | 2/2021 | Bono | G06F 16/185 |
| 11,086,553 B1* | 8/2021 | Fisher | G06F 3/0647 |
| 11,210,009 B1* | 12/2021 | Freilich | G06F 3/0685 |
| 2013/0318051 A1* | 11/2013 | Kumar | G06F 16/1748 |
| | | | 707/692 |
| 2014/0006465 A1* | 1/2014 | Davis | G06F 16/1752 |
| | | | 707/827 |
| 2015/0312274 A1* | 10/2015 | Bishop | H04L 63/20 |
| | | | 726/1 |
| 2017/0257254 A1* | 9/2017 | Petri | H04L 29/0854 |
| 2019/0286373 A1* | 9/2019 | Karumbunathan | G06F 3/065 |
| 2020/0026566 A1* | 1/2020 | Baggerman | G06F 40/186 |
| 2020/0233752 A1* | 7/2020 | Wong | G06F 16/1748 |
| 2021/0232459 A1* | 7/2021 | Katiyar | G06F 11/1453 |

\* cited by examiner

RECONSTRUCTING LOST DATA OBJECTS BY GENERATING VIRTUAL USER FILES FROM AVAILABLE NODES WITHIN A CLUSTER

CROSS-REFERENCE TO RELATED APPLICATIONS

This application is related to co-pending application Ser. No. 16/664,252 entitled "Reconstructing Lost Data Objects By Generating Virtual User Files From Available Tiers Within A Node," filed on Oct. 25, 2019, which is hereby incorporated by reference its entirety.

TECHNICAL FIELD

This invention relates generally to deduplication storage systems, and more particularly to reconstructing lost data using a virtual user file from available nodes or tiers.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data accessing mechanisms easier and reliable. Large-scale cloud computing infrastructure and services are often provided by cloud providers that maintain data centers that may be located long distances from many of the users. Cloud networks are widely used for large-scale data backup operations by enterprises that process large amounts of data on a regular basis, such as weekly or daily company-wide backups. Cloud storage (the "cloud tier") is typically associated with long-term storage of data that is stored for archival purposes and infrequently accessed, while local network storage (the "active tier") is associated with presently processed data.

Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication. Certain deduplication file systems (e.g., EMC Data Domain) implement a multi-tiered deduplication file system that allows files to be moved between cloud and active tiers, while maintaining one namespace. The location of the file is strictly binary in that it is either in the active tier or on the cloud tier. Such systems may use certain tagging and filtering processes to allow temporary movement of data between the active and cloud tiers. Backup solutions such as Data Domain are typically the last resort for data recovery. If the primary copy of the data is lost, it is recovered from the secondary storage, like Data Domain system. If the backup copy of the data is lost, it may not be possible to recover the lost data, since it is the last copy of the data. Hence, it is critical for these backup solutions to provide the data protection and integrity capabilities.

Deduplication systems, such as the DellEMC Data Domain File System (DDFS), include a cloud-tier capability allowing applications to move data from an on-premise active-tier to the cloud. For example, Data Domain has a single namespace that spans both active and cloud tiers. When a file is moved from active to cloud-tier, the location information of the file referring to cloud object storage is stored in the namespace. In certain present systems, if there is a missing segment in a backup set, the impacted files are identified and these files are removed from the system and to be recovered from primary system or replication systems. If the file copy is not in either the primary or replication system, then the corrupt file cannot be recovered.

What is needed therefore, is a system and method for reconstructing corrupt files from available nodes or tiers and heal or repair the corrupt files.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing and storage in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1A:
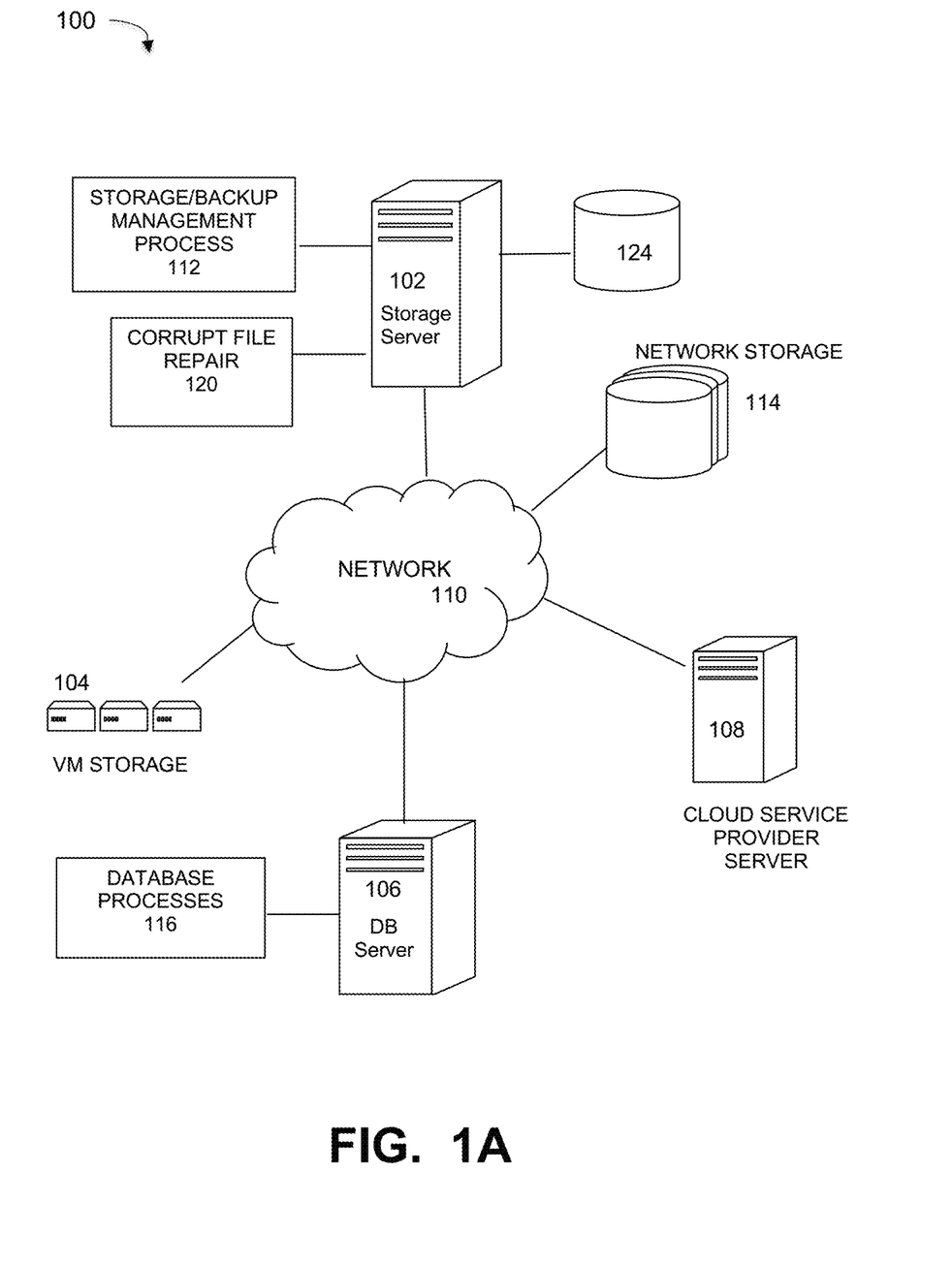
FIG. 1A is a diagram of a cloud computing network implementing an instant replay process for moving a file to a cloud tier in a deduplication storage system, under some embodiments.

Embodiments are described for a method to reconstruct corrupt files from available nodes or tiers and heal or repair the corrupt files in a deduplication backup system. FIG. 1A illustrates a computer network system that implements one or more embodiments of a cloud storage network system implementing a corrupt file reconstruction and repair process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 maybe a database server executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations and performance requirements provided by the provider. The cloud service provider server 108 may maintained be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier will have one or more cloud units that are used for data migration and storage using migration, copying, duplication, long-term retention (LTR), and other processes.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1A, the storage server 102 also executes a process 120 to reconstruct corrupt files from available nodes or tiers and heal or repair the corrupt files. For purposes of this description, cloud tier storage refers to network or cloud implemented storage media that is used to store data for archival or long-term storage purposes and that imposes a cost in terms of provider fees and/or resource overhead to access; while active tier storage refers to storage that may be faster and smaller than cloud storage, but that is readily accessible and used for temporary storage or present processing of data. It should be noted that process 120 may be executed by the storage server 102, or any other server within the system 100 and coupled to network 110, such as a dedicated restoration server.

Figure 1B:
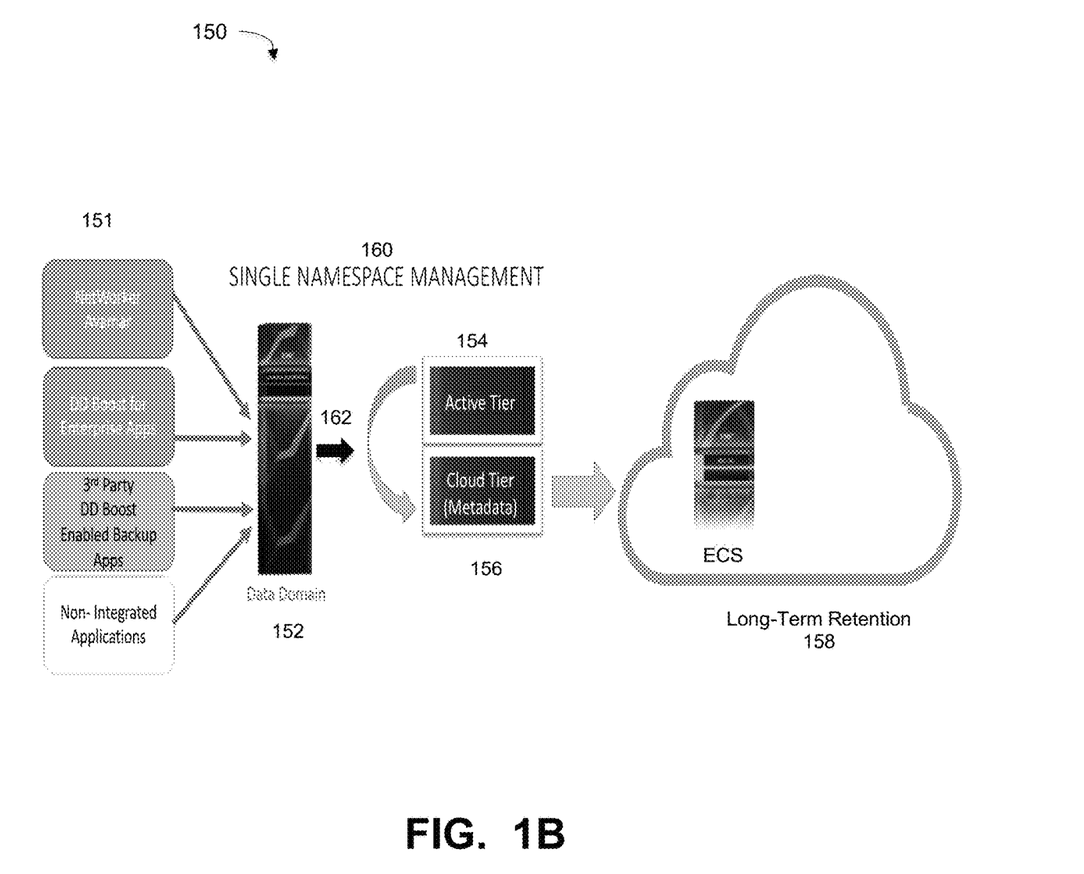
FIG. 1B illustrates an example of single namespace management for an active tier and a cloud tier in a deduplication storage system, under some embodiments.

The Data Domain File System is an example of a multi-tiered deduplication file system that allows files to be moved between cloud storage and active storage tiers, while maintaining one namespace, where the cloud tier is typically associated with long-term storage of data and the active tier is associated with presently processed data. FIG. 1B illustrates an example of single namespace management for an active tier and a cloud tier in a deduplication storage system, under some embodiments. Diagram 150 illustrates a system having a deduplication backup (e.g., Data Domain) server 152 that processes data from a number of applications 151. Server 152 executes a single namespace management process 160 that implements one or more data movement policies 162 to move data from the active tier 154 to the cloud tier 156. The cloud tier is embodied in long-term retention or storage 158 provided by cloud providers, such as Amazon (e.g., Amazon Web Services, AWS) or Microsoft Azure, or any other public or private cloud provider, such as ECS.

For the embodiment of FIG. 1B, the data movement between the active and cloud tiers is managed via a single data domain namespace management process or component 160. In general, there is no separate cloud gateway or virtual appliance required. The data movement is supported by the native Data Domain policy management framework. When data is moved from the active tier 154 to the cloud tier 156 (in a recall/replay operation), it is deduplicated again, and is written and stored in object storage in the same native Data Domain deduplicated format. This way, cloud access is optimized or minimized since the data is stored in the cloud storage in the deduplicated (compressed) format. The cloud data movement can run concurrently with garbage collection (GC) processes on active tier.

With respect to a certain example embodiment, the DellEMC Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file system that forms segments from data, these segments are uniquely identified by their key/label called a fingerprint. Given a file offset and length, the corresponding data segment fingerprints need to be looked up. To provide faster offset to fingerprint lookup, the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A fingerprint is thus a compact representation of the actual data (or segment). The data (or segment) is passed through a SHA-1 (Secure Hash Function) cryptographic hash function. This produces a hash value (size 20 bytes), and this hash value is called a "fingerprint." Each unique data segment will generate a unique fingerprint (e.g., 20 bytes in size) and this fingerprint is used to index and get the actual data segment. Basically, the fingerprint is a compact representation of the actual data, and is used to deduplicate the data ingested into the file system.

A file in DDFS is represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
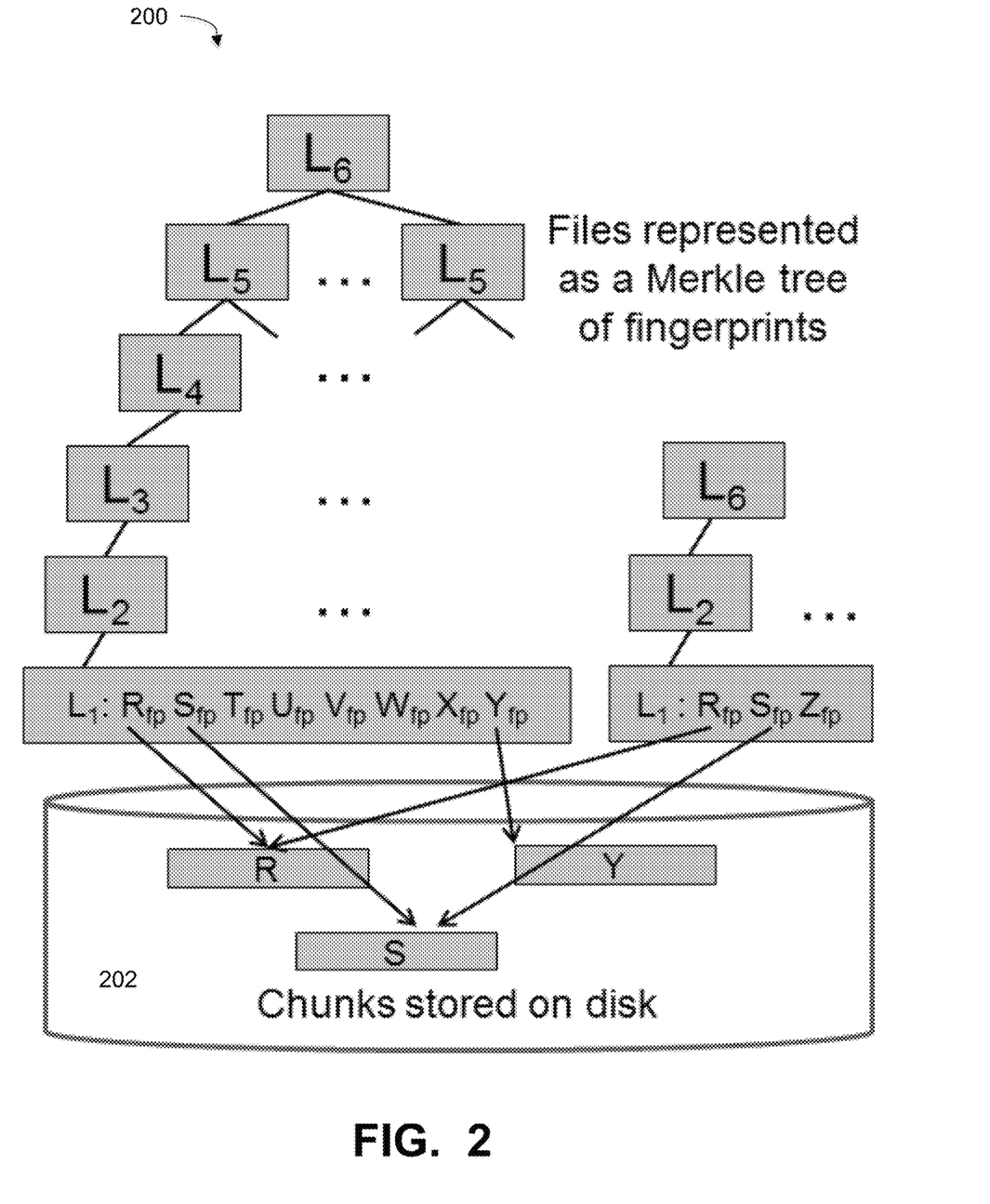
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as Lp chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, Lp chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$.

Figure 3:
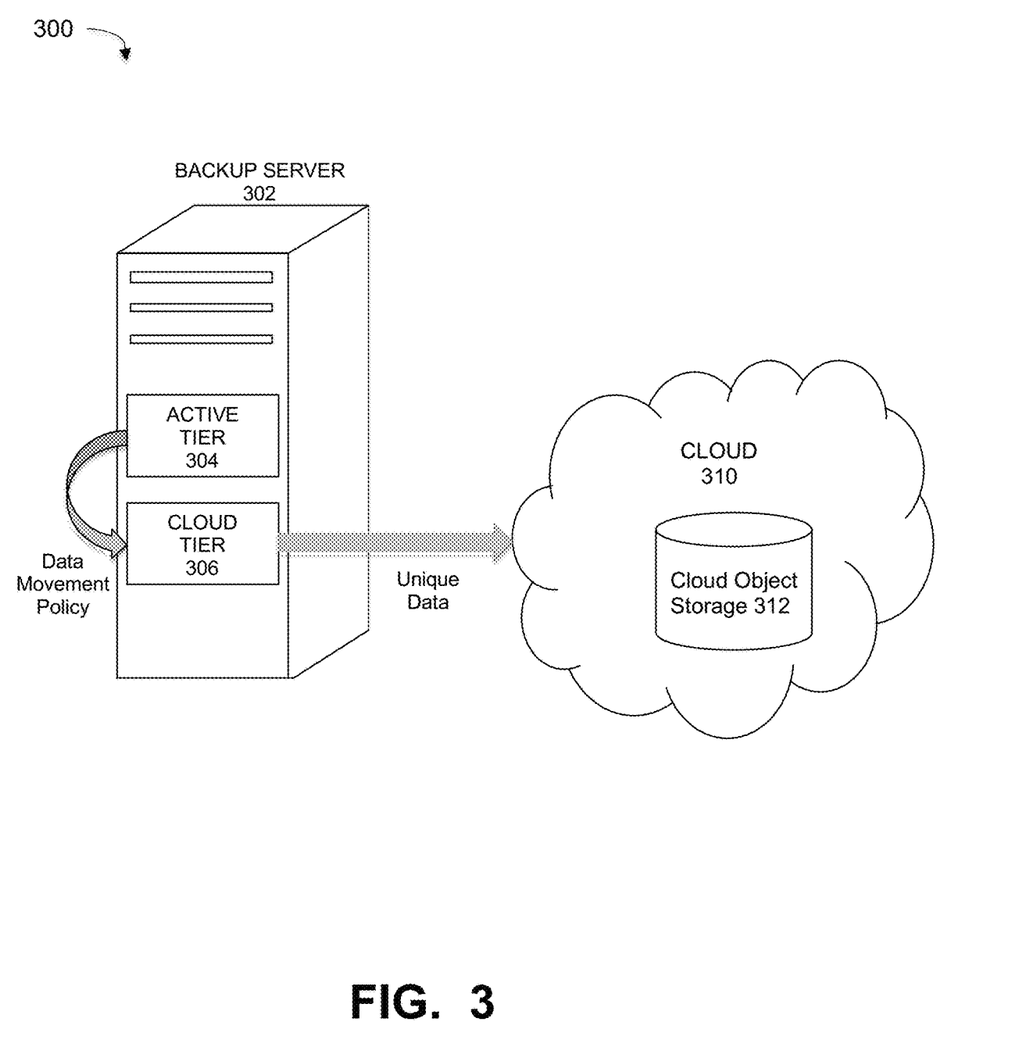
FIG. 3 illustrates a cloud tier implementation for a deduplication backup system, under some embodiments

Certain deduplication systems, such as DDFS, have a cloud-tier capability allowing applications to move data from on-premise active-tier to cloud. It has a single namespace that spans both active and cloud tiers. Using the cloud tier, users can send data directly from a backup appliance to any of the validated and supported cloud object storage providers; public, private or hybrid for long-term retention of data. The cloud tier may be provided as a native application that can natively tier deduplicated data to the cloud, such that no separate cloud gateway or virtual appliance is required. FIG. 3 illustrates a cloud tier implementation for a deduplication backup system, under some embodiments. As shown in system 300, backup server maintains an active tier 304 in its local memory or closely coupled storage. Because it is local to the backup system, the active tier is considered an "on-premise" data tier. Data from this active tier is sent directly from the backup system to the cloud 310 with seamless management through a management process where a data movement policy is managed with respect to cloud tier 306. This provides automated data movement and seamless management where unique (deduplicated) data is sent directly from the backup system to cloud object storage 312. Although an embodiment is shown where no separate gateway or virtual appliance is required, alternative embodiments may use such gateways or appliances to implement a cloud tier, depending on configurations and limitations of the backup system 302. Additionally, the cloud tier 306 may support certain types of encryption to encrypt all data in the backup system or just the data being stored in the cloud tier.

As shown in FIG. 3, an object storage 312 is provided as a service in the cloud network. Object storage (or object-based storage) is a storage architecture that manages data as objects, as opposed to file systems that manage data as a file hierarchy and block storage that manages data as blocks within sectors and tracks. Each object typically includes the data itself, a variable amount of metadata and a globally unique identifier. Each data segment is thus stored as an object with a unique object_ID (e.g., 64 bit). When the data is later accessed, it is referenced by the ID instead of a layered (hierarchical) file name. Object storage can be implemented at multiple levels, including device level, system level, and interface level. In a cloud network, such as cloud 310, object storage is typically provided as a service in a public cloud from a cloud vendor, and it can be accessed by multiple VMs when credentials and policies apply.

When a file is moved from the active tier 304 to the cloud tier 306, the location information of the file referring to cloud object storage 312 is stored in the namespace. For the cloud tier, a container referred to as a "CMETA container" stores the metadata sections of multiple L0 and Lp containers. Data Domain adopts a meta-separated architecture to store the metadata in the local storage and the actual data in the cloud object store. The metadata is stored locally to avoid cloud reads during ingest for deduplication and during garbage collection for enumeration. The local metadata consists of Lp containers and CMETA containers. The L0 containers are stored directly in the cloud. The first version of the cloud-tier solution stores each compression region of an L0 container as an individual object in the cloud. The second version of cloud-tier solution stores the entire L0 container as a single object in the cloud, thus substantially reducing the total number of objects in the cloud, by increasing the object size.

Figure 4:
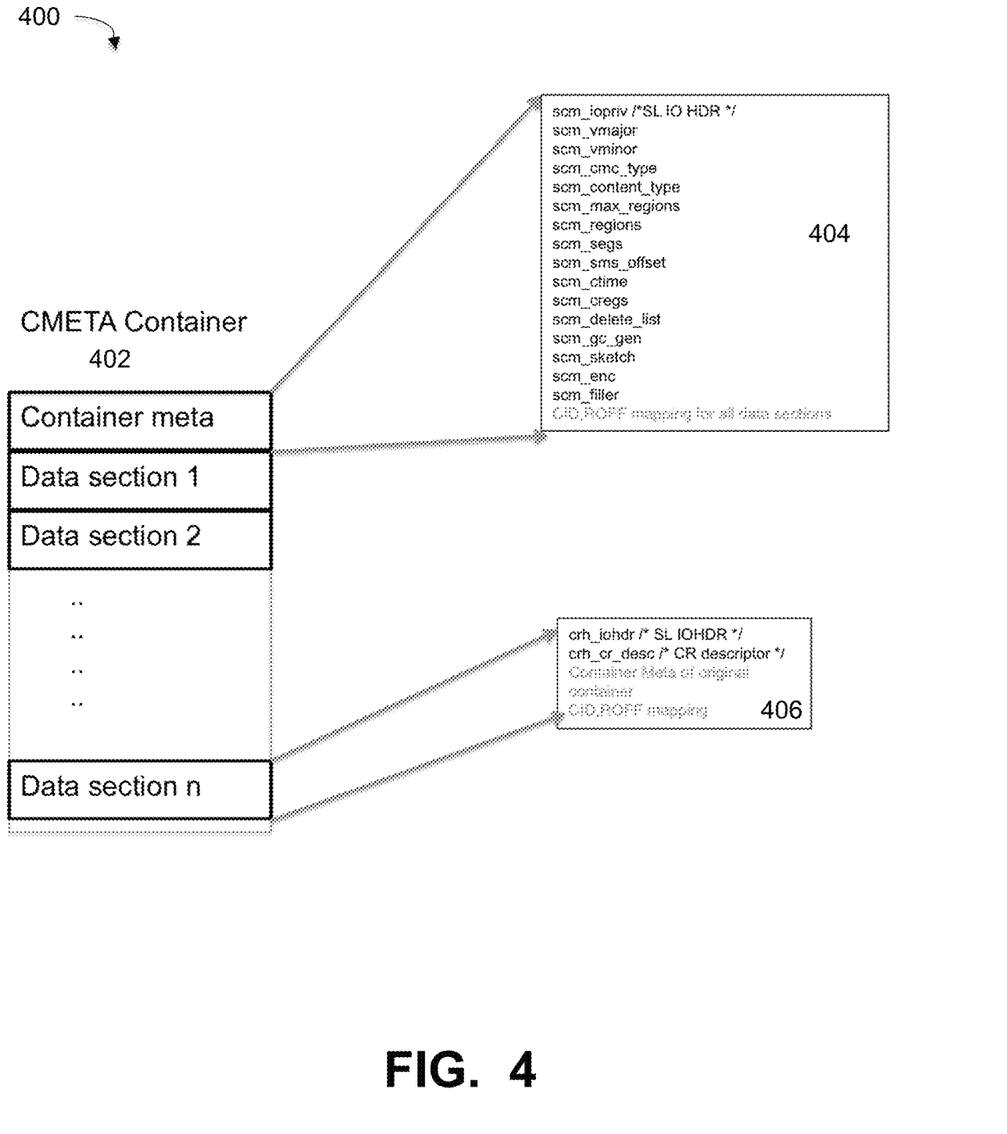
FIG. 4 illustrates a metadata (CMETA) container on disk format, under some embodiments.

FIG. 4 illustrates a metadata (CMETA) container on disk format, under some embodiments. As shown in diagram 400 of FIG. 4, a CMETA container 402 consists of the container metadata ('meta') followed by a number, n, of data sections. The meta section 404 includes a number of entries for parameters that describe the container, and the data sections 406 each comprise information about the corresponding data objects. The CMETA container 402 contains a metadata section that is the same as a regular container metadata, except at the end it contains the mapping of the original container ID and the region offset of the regions in the original containers for all the data sections. Each data section of the CMETA container will contain the metadata of the original container along with the container ID, and region offset mapping (CID, ROFF) from the original container.

As stated in the Background section, in present systems if segments or data is lost in the system, the process traverses the namespace and identify all the files referring these lost segments. These files are called corrupt files and are removed from the system. Customers may try to recover the corrupt files from a mirrored copy or primary storage. However, if the copies of these files are not present either on the primary storage or mirror, then there is no way to recover these files, resulting in permanent data loss. Also, in deduplication file systems, a single missing segment may impact many user files and the corruption might be wide spread.

Embodiments of the reconstruction and repair process 120 reconstruct the corrupt files from available nodes or tiers and heal or repair the corrupt files. The reconstruction and repair process looks for the existence of fingerprints of the lost segments in available tiers (active and cloud on the nodes. The process discovers the copies of these missing segments, creates an Lp tree referencing these discovered segments and creates a virtual file in the namespace. This file is then moved to the destination (e.g., cloud) tier where the corruption exists, thus, healing the corruption.

Figure 5A:
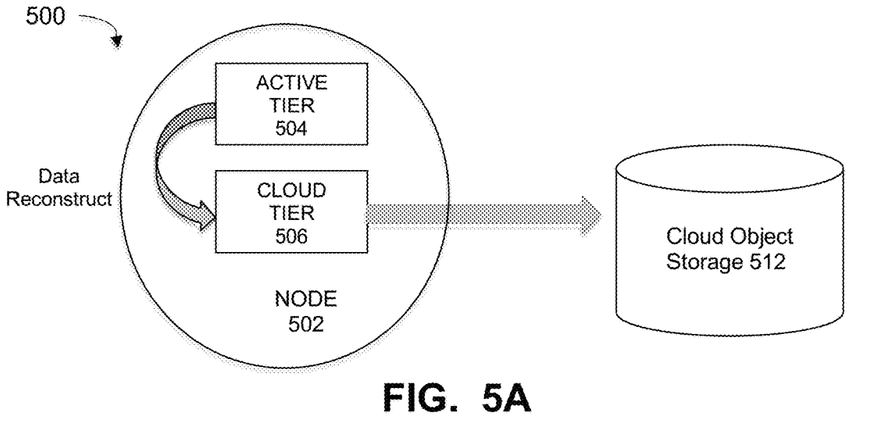
FIGS. 5A, 5B, and 5C illustrate these modalities for implementation of a lost data object reconstruction process using a virtual user file generated from available nodes or tiers, under some embodiments.
Figure 5B:
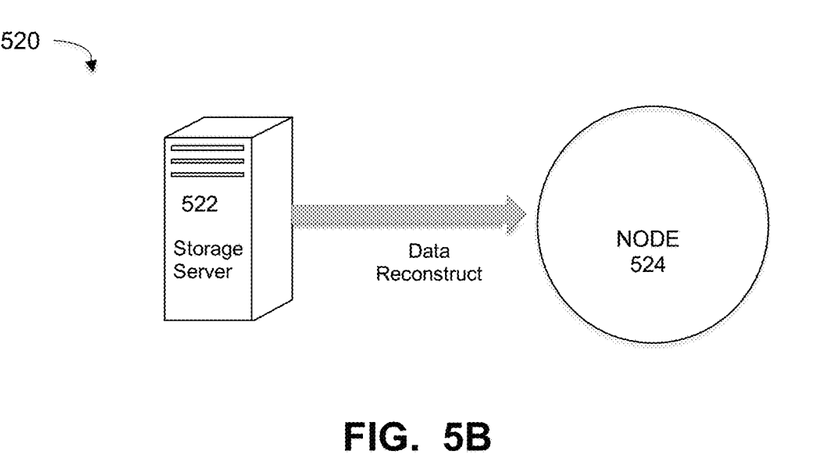
Figure 5C:
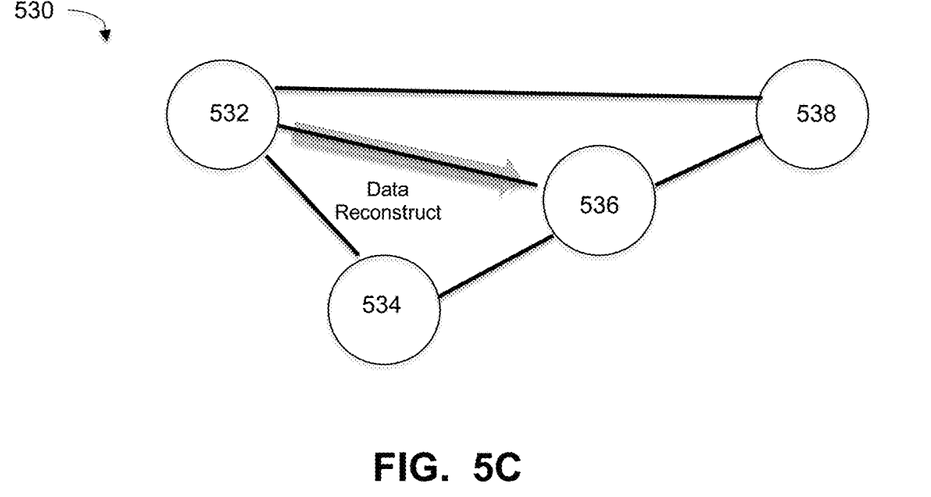

Embodiments can be directed to reconstructing missing segments from active-tier to cloud-tier and vice versa on a single node; reconstructing missing segments from a replication backup system to a node having missing segments; or reconstruct missing segments from one node to another node in a cluster. FIGS. 5A, 5B, and 5C illustrate these modalities for implementation of a lost data object reconstruction process using a virtual user file generated from available nodes or tiers, under some embodiments. Diagram 500 of FIG. 5A illustrates reconstruction of missing segments from an active tier 504 to a cloud tier 506 within a single node 502 prior to storage in cloud object storage 512. Diagram 520 of FIG. 5A illustrates reconstruction of missing segments from a storage server 522 of a deduplication backup system to a node 524. Diagram 530 illustrates reconstruction of missing segments from a first node 532 to a second node 536 in a cluster having a number of nodes 532, 534, 536, and 538.

When a file is read or restored from Data Domain, the restore fails. The file read/restore at a certain offset and for certain size first results in walking the Merkel tree of the file, starting from L6 segment, down all the way to L0 segment. From the namespace entry for the file, the process gets the content handle from which it gets the L6 reference. The process does an index lookup for the L6 reference (also known as fingerprint) and gets the corresponding container-ID having the actual L6 segment. It reads the L6 segment data and gets the next lower Lp fingerprint, e.g., L1 fingerprint. It then does an index lookup of the L1 fingerprint and gets the container-ID having the actual L1 segment data. From this container, it gets the L0 fingerprints.

If there is a data corruption on the cloud provider and some data objects are lost, the system has an L0 fingerprint. However, the actual L0 object is lost in the cloud. From the L0 fingerprint, the process issues an index lookup to get the L0 object-ID (or container-ID). When it tries to read this L0 object, there is an error that the object does not exist. This results in a read/restore failure. This is a typical case of data corruption or data loss.

Figure 6:
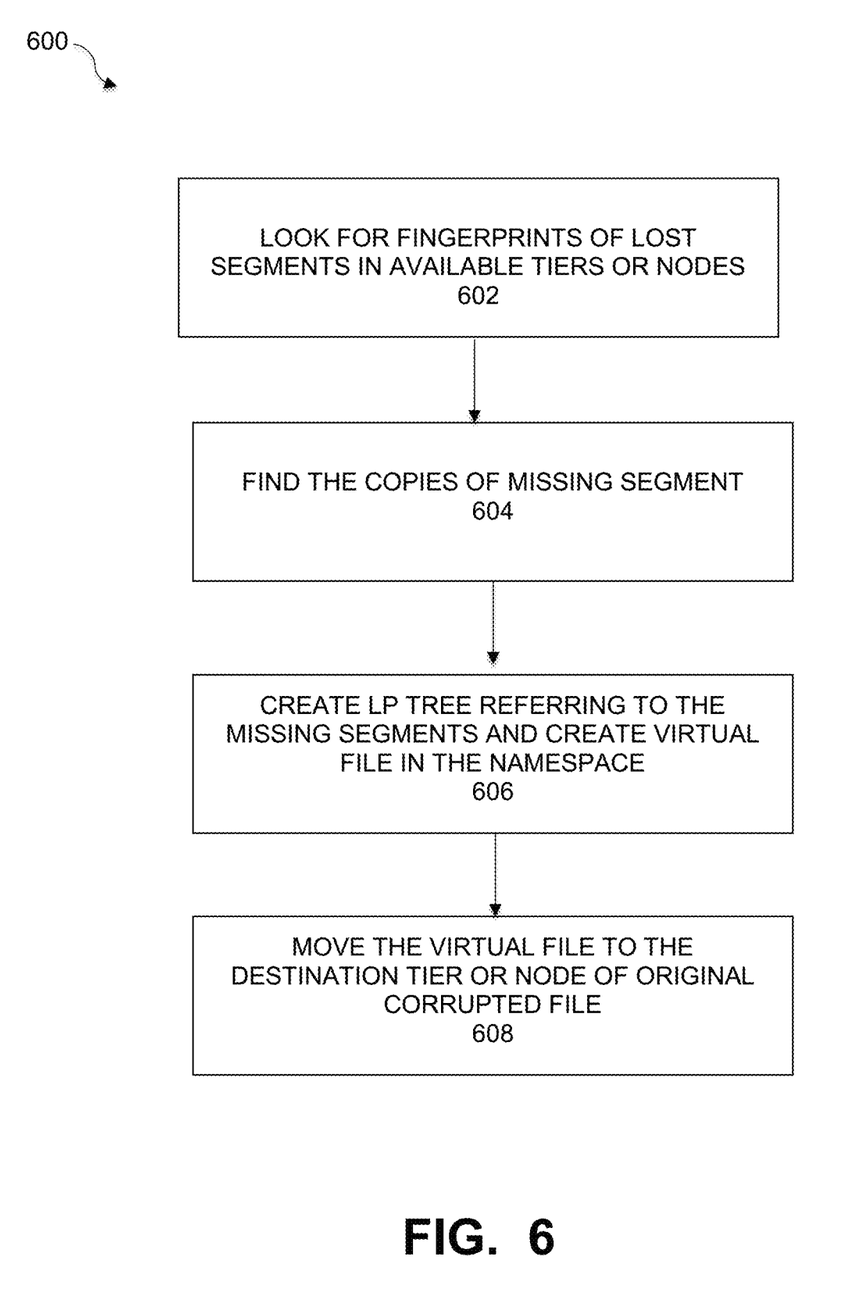
FIG. 6 is a flowchart that illustrates an overall method of reconstructing and repairing corrupt files between tiers within a node or nodes within a cluster, under some embodiments.

FIG. 6 is a flowchart that illustrates an overall method of reconstructing and repairing corrupt files between tiers within a node or nodes within a cluster, under some embodiments. In general, a corrupted file is manifested in the form of one or more lost or missing segments. As shown in FIG. 6, process 600 begins at step 602 by looking for the existence of fingerprints of the lost segments in a tier (e.g., cloud tier 506) or node (e.g., node 536). Through this investigation, the process discovers the copies of these missing segments, step 604. It then creates an Lp tree referring these discovered segments and creates a virtual file in the namespace, step 606. In step 608, this virtual file is then moved to the destination tier or node tier where the corrupted file exists. This effectively restores the lost or missing segments to reconstruct the corrupted file and remedy the file corruption.

For a missing segment, the system knows the fingerprint, however, the actual data (or segment) is missing in the system, and FIG. 6 illustrates an overall process that applies in the case of reconstructing corrupted files between tiers within a node, or nodes within a cluster. Specific process steps may be implemented separately for each of these applications, as shown in FIGS. 7 and 8.

Although embodiments are described to determining issues with files between nodes within a cluster, it should be appreciated that embodiments can also apply to similarly processing data within any configuration of networked machines. For example, embodiments can apply to machines within a data center or across data centers, wherein the data centers may be maintained by companies, organizations, governments, and so on. In this case, the notion of a 'cluster' can be expanded to include a distributed network of practically any scale, and a 'node' may be a computer, server, or other processing machine. The network may also be at least partially wireless of cellular-based.

Figure 7:
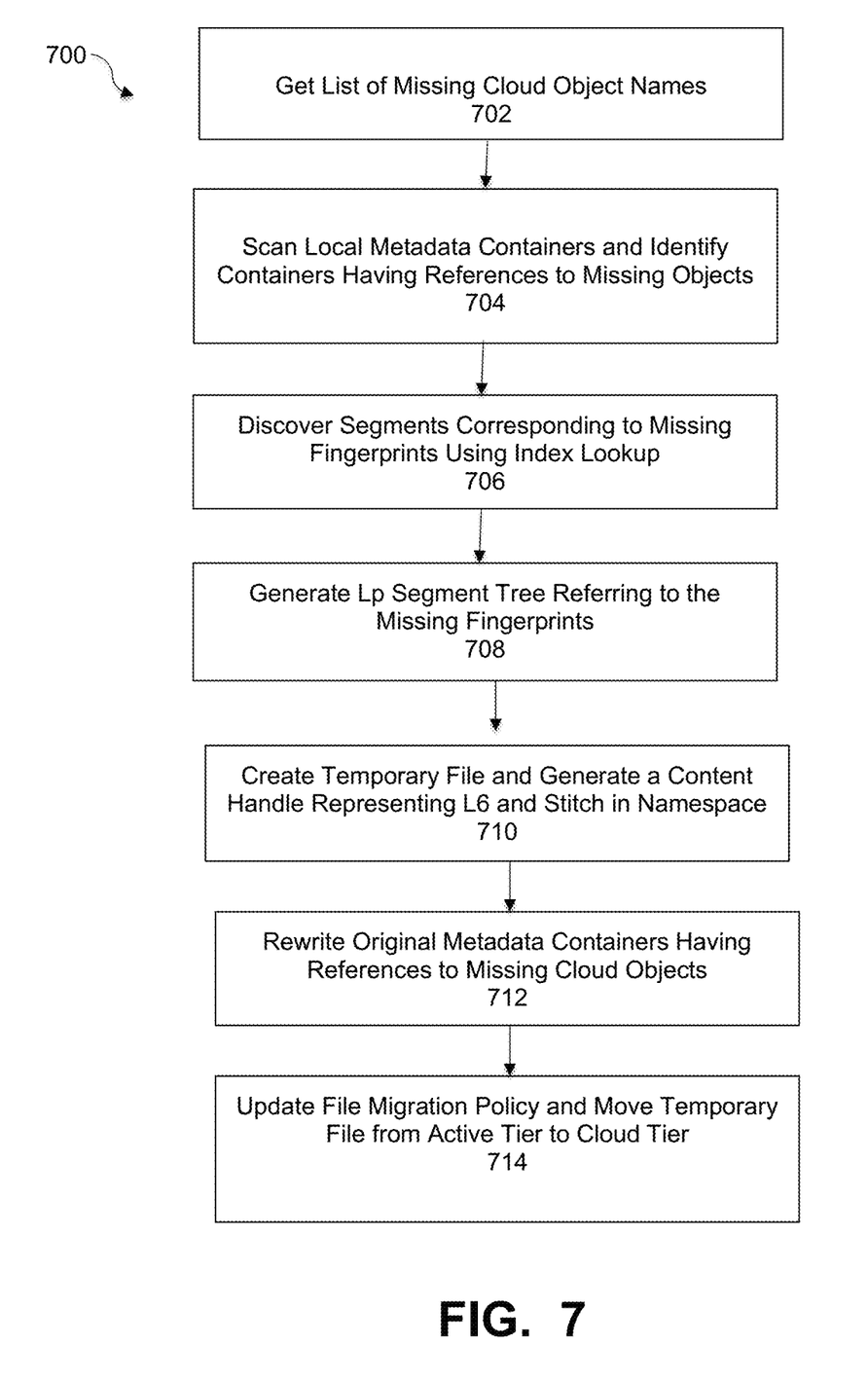
FIG. 7 is a flowchart that illustrates a method of reconstructing and repairing corrupt files, under some embodiments.
Figure 8:
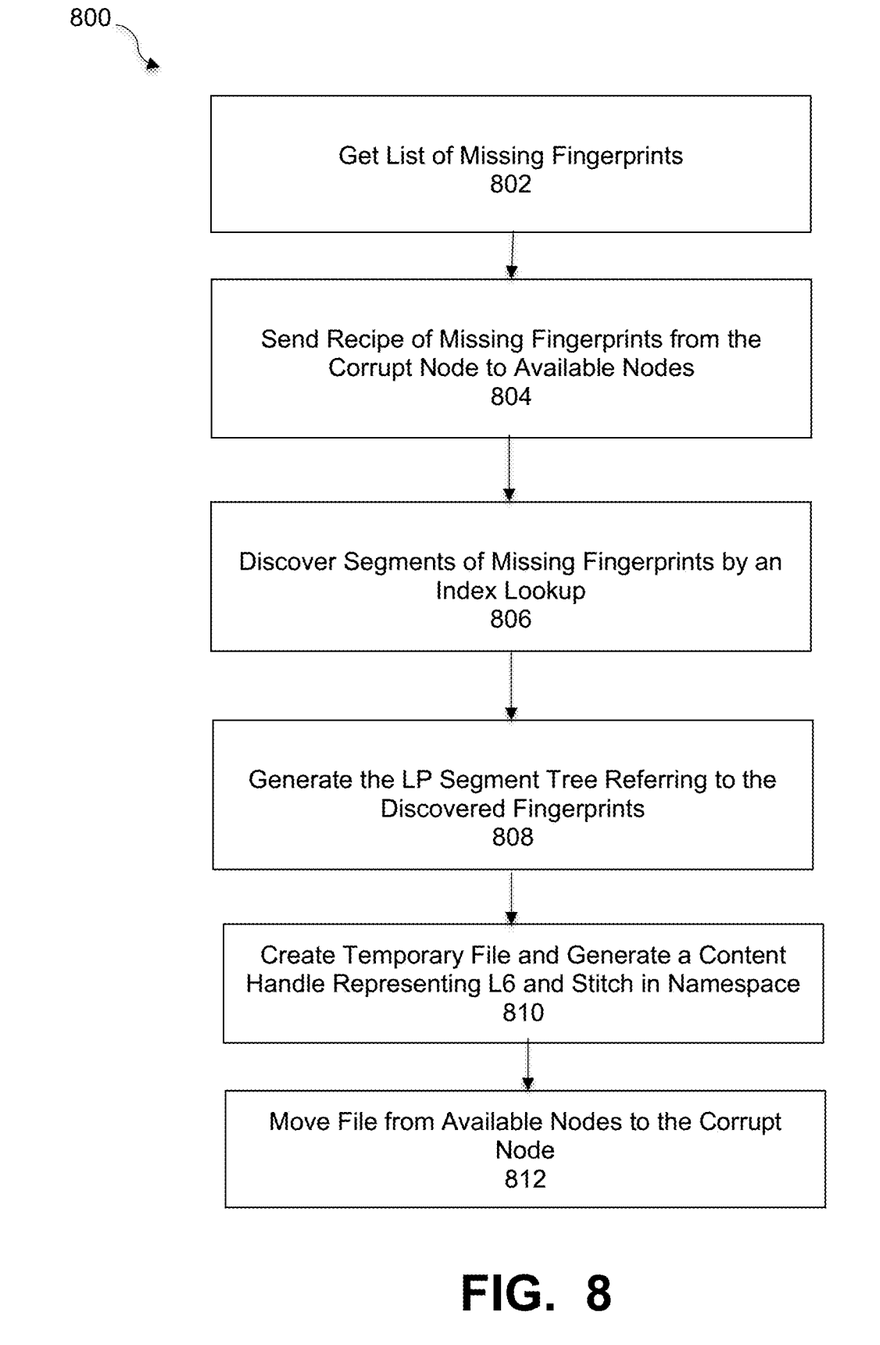
FIG. 8 illustrates a method to reconstruct lost data from across the nodes in a cluster to the impacted node or from a replica system, under some embodiments.

FIG. 7 is a flowchart that illustrates a method of reconstructing and repairing corrupt files between an active tier and cloud tier, under some embodiments. Process 700 reconstructs lost data on the cloud tier using the active tier for a modality such as shown in FIG. 5A, and starts by getting the list of missing cloud object names, step 702. The process then scans the local CMETA containers, identifies the CMETA containers having references to the missing cloud objects, and identifies the corresponding fingerprints of the missing objects, step 704. It then performs an index lookup of each missing fingerprint on available nodes or tiers to discover the segments corresponding to these missing fingerprints, step 706. The Lp (L1 to L6) segment tree referring these discovered fingerprints is then generated, step 708.

The process then creates a temporary file, generates a content handle representing the L6 generated above and stitches it in the namespace, step 710. It then rewrites the original CMETA containers having references to missing cloud objects by dropping the metadata sections of missing cloud objects, step 712. This will bring the metadata of the filesystem into consistent state and remove the entries of missing fingerprints from index.

With respect to stitching, the process creates a temporary file, generates a content handle representing the L6 generated above, and updates the temporary file in the namespace. This creation of temporary file entry in the namespace facilitates the file data movement from one tier to another, just like any other regular file. As part of file movement, the data underneath the file automatically moves to the destination tier/node. This way, the system recovers the lost data segments on destination from available source nodes/tiers.

In step 714, the process updates the file migration policy and moves the temporary file from active to cloud tier. As part of file movement, all the L0 segments found in step 706 are copied from the active tier to the cloud tier. This will also generate new CMETA containers referring the new data objects and updates the index with fingerprint entries mapping new CMETA containers. The file migration policy can also be used to move the temporary file between two nodes within a cluster.

FIG. 8 illustrates a method to reconstruct lost data from across the nodes in a cluster to the impacted node or from a replica system, under some embodiments. In general, a cluster is a collection of any number of nodes that communicate with each other to perform operations. Each node is a single computing machine (e.g., server). Nodes may be organized into master and worker arrangements, node groupings, and so on. The cluster may execute a cluster file system, or similar file system, that is shared by being simultaneously mounted on multiple servers or computers in the network. Such a file system may be implemented through a shared-disk file system, a distributed file system, a network-attached storage file system, or any similar file system or combination thereof.

Process 800 of FIG. 8 begins by getting the list of missing fingerprints, step 802. It then sends the missing fingerprints from the corrupt node to other available nodes, step 804. On these available nodes, the process then does an index lookup and discovers the segments of these missing fingerprints. It then generates the Lp (L6 to L1) segment tree referring these discovered fingerprints, step 808. A temporary file is then created and a content handle representing the L6 generated above is generated and stitched in the namespace, step 810. This file is then moved from the available nodes to the corrupt node, step 812.

As shown in FIG. 3, a deduplication backup system, such as DDFS, which uses a cloud tier, files are moved from the active tier to the cloud tier based on user migration or data movement policy. Such a policy may be based on specific rules dictating when and which files are moved. A typical movement rule may cause file movement based on the age of the files, but other characteristics are also possible. After the files are moved to the cloud 310, a garbage collection (GC) process cleans the dead space on active-tier. The GC process usually runs as a separate background job to scan all data segments in the file system to find out unreferenced data segments and remove them to release disk space. It also re-packs data into new objects in order to make data objects in similar size, since keeping all objects in as similar a size as possible generally helps performance, and prevents growing metadata due to storing very small objects.

Such a garbage collection process may not clean all the segments copied from the active tier to the cloud tier, since files remaining on active tier may continue to share the same copies of data. Also, garbage collection does not clean every dead segment in the system to avoid unnecessary copy forwards of containers. Also, as older generation backup files are moved from the active to the cloud tier, due to small change rate, the newer generation backups ingested on active-tier tend to have an overlap of data with older generations. Hence, there is a high likelihood of finding the cloud missing segments on active tier.

The likelihood of recovering missing segments is also improved by the fact that an ingest on a DDFS system is deduplicated against existing fingerprints in the index. The DDFS does an index lookup of ingested data to find if this data is already present in the file system. The index lookup incurs disk reads to bring the on-disk container metadata (CMETA) into an in-memory fingerprint cache. To avoid too frequent on-disk index lookups, DDFS does a lookup after every 1 MB horizon of data, for performance benefits. Due to this, DDFS does not do perfect data deduplication, as it will write some duplicate data in the system. If the missing fingerprints have duplicate copies, then the data is recovered from other copies of the fingerprints.

System Implementation

With respect to the flowcharts of FIGS. 6, 7, and 8, the functional steps may be performed by hardware processing components provided by one or more of the servers or resources of system 100 of FIG. 1A. Such components may be provided or embodied as part of backup process/component 112 and corrupt file repair process/component 120. Such components may be embodied as one or more (first, second, third, etc.) hardware, processing, or programmed circuits configured to execute program instructions to perform a certain task, interfaces to transmit and receive data within a computer (node) or between computers (nodes), co-processors to perform subroutines or sub-tasks, and other similar components.

Embodiments of the processes and techniques described above can be implemented on any appropriate backup system operating environment or file system, or network server system. Such embodiments may include other or alternative data structures or definitions as needed or appropriate.

Figure 9:
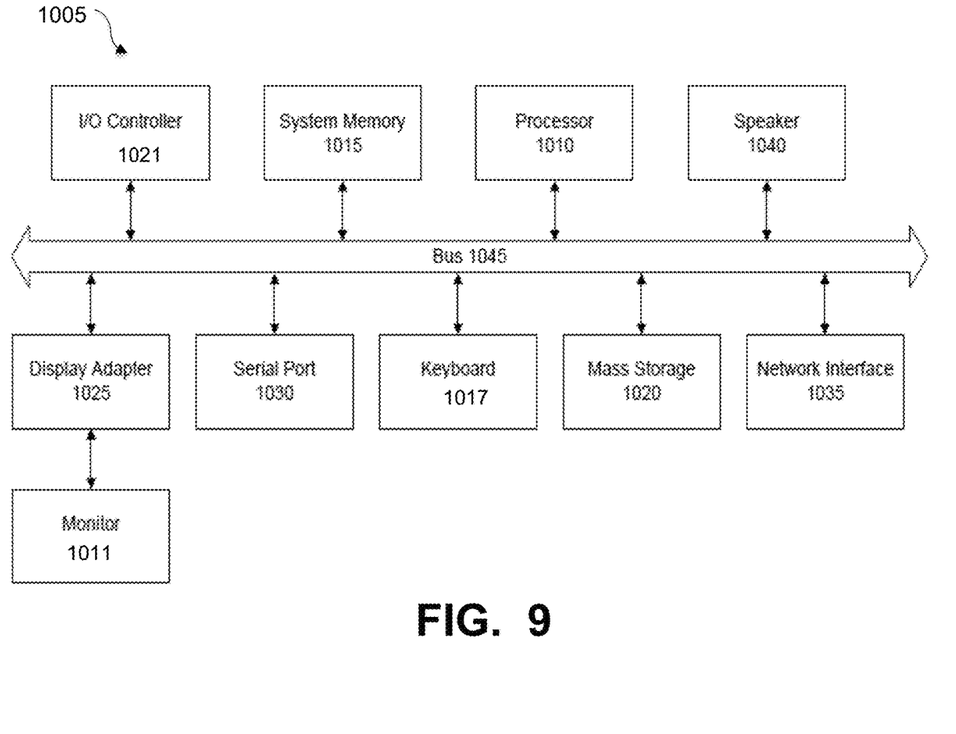
FIG. 9 is a system block diagram of a computer system used to execute one or more software components of a lost data object reconstruction process, under some embodiments.

The network of FIG. 1A may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of reconstructing and repairing corrupt files between a first node and a second node within a computer network comprising:
   looking for fingerprints of missing segments of a corrupted file in the second node;
   discovering copies of these missing segments in the second node;
   creating an Lp tree referring the discovered segments;
   creating a temporary virtual file in a single namespace encompassing both the first node and the second node;
   storing location information of the file in a metadata container storing a mapping of an original container and a region offset of regions is original containers for data including the file data, wherein content of the file comprises a lower segment of a Merkle tree, and wherein leaf nodes in the segment tree comprise L0 segments or data segments, and the segment tree comprises the metadata (Lp) segments, and further wherein the fingerprint is one of a plurality of fingerprints for the file content and that are collected in Ln segments; and
   moving the virtual file from the first node to the second node to thereby restore the missing segment and reconstruct the corrupted file using the metadata container, wherein the first node is one of an active tier node or cloud tier node, and the second node is one of the cloud tier node or the active tier node and of a different tier from the first node.

2. The method of claim 1 wherein the computer network comprises a cluster of nodes and the first node is an available node within the cluster, the method further comprising:
   sending missing fingerprints for the missing segment from second node to the first node;
   discovering the segments corresponding to missing fingerprints using an index lookup; and
   generating the LP tree referring to the discovered missing fingerprints.

3. The method of claim 2 wherein the step of creating the temporary virtual file comprises generating a content handle representing L6 and stitching into the namespace.

4. The method of claim 3 further comprising moving the temporary virtual file from the first node to the second node, and wherein the metadata container comprises a cloud tier container storing metadata sections of multiple L0 and Lp containers.

5. The method of claim 4 further comprising updating a file migration policy and moving the temporary virtual file from one node to another node in the cluster.

6. The method of claim 1 wherein the first and second nodes comprise part of a deduplication backup process executed by a data storage server running a Data Domain file system (DDFS).

7. A system for reconstructing and repairing corrupt files between a first node and a second node within a computing cluster comprising:
   a first corrupt file repair component configured to look for fingerprints of missing segments of a corrupted file in the cloud tier, discover copies of these missing segments in the node;
   a second corrupt file repair component configured to create an Lp tree referencing the discovered segments, and create a temporary virtual file in a single namespace encompassing both the active tier and the cloud tier;
   a metadata container storing location information of the file by mapping an original container and a region offset of regions is original containers for data including the file data, wherein content of the file comprises a lower segment of a Merkle tree, and wherein leaf nodes in the segment tree comprise L0 segments or data segments, and the segment tree comprises the metadata (Lp) segments; and further wherein the fingerprint is one of a plurality of fingerprints for the file content and that are collected in Ln segments; and
   an interface moving the virtual file from the first node to the second node to thereby restore the missing segment and reconstruct the corrupted file using the metadata container, wherein the metadata container comprises a cloud tier container storing metadata sections of multiple L0 and Lp containers.

8. The system of claim 7 wherein the first node is an available node within the cluster, the first corrupt file repair component further configured to send missing fingerprints for the missing segment from second node to the first node, discover the segments corresponding to missing fingerprints using an index lookup, and generate the Lp tree referring to the discovered missing fingerprints.

9. The system of claim 8 wherein the creating the temporary virtual file comprise generating a content handle representing L6 and stitching into the namespace.

10. The system of claim 9 wherein first corrupt file repair component further moves the temporary virtual file from the first node to the second node, and wherein the metadata container comprises a cloud tier container storing metadata sections of multiple L0 and Lp containers.

11. The system of claim 10 wherein the first corrupt file repair component updates a file migration policy and moving the temporary virtual file from one node to another node in the cluster.

12. The system of claim 7 wherein the first and second nodes comprise part of a deduplication backup process executed by a data storage server running a Data Domain file system (DDFS).

13. The system of claim 12 wherein the cluster executes a cluster file system for managing data within the nodes in the system.

14. A computer program product, comprising a non-transitory computer-readable medium having a computer-readable program code embodied therein, the computer-readable program code adapted to be executed by one or more processors to implement a method reconstruct and repair corrupt files between nodes within a cluster by:

looking for fingerprints of missing segments of a corrupted file in the second node;
discovering copies of these missing segments in the second node;
creating an Lp tree referring the discovered segments;
creating a temporary virtual file in a single namespace of encompassing both the first node and the second node;
storing location information of the file in a metadata container storing a mapping of an original container and a region offset of regions is original containers for data including the file data; and
moving the virtual file from the first node to the second node to thereby restore the missing segment and reconstruct the corrupted file using the metadata container, wherein the first node is one of an active tier node or cloud tier node, and the second node is one of the cloud tier node or the active tier node and of a different tier from the first node.

15. The computer program product of claim 14 wherein the metadata container comprises a cloud tier container storing metadata sections of multiple L0 and Lp containers.

\* \* \* \* \*